US011423586B2

(12) United States Patent
Samarasekera et al.

(10) Patent No.: US 11,423,586 B2
(45) Date of Patent: Aug. 23, 2022

(54) AUGMENTED REALITY VISION SYSTEM FOR TRACKING AND GEOLOCATING OBJECTS OF INTEREST

(71) Applicant: SRI International, Menlo Park, CA (US)

(72) Inventors: Supun Samarasekera, Skillman, NJ (US); Taragay Oskiper, Princeton, NJ (US); Rakesh Kumar, West Windsor, NJ (US); Mikhail Sizintsev, Plainsboro, NJ (US); Vlad Branzoi, Lawrenceville, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/157,065

(22) Filed: Jan. 25, 2021

(65) Prior Publication Data

US 2021/0142530 A1    May 13, 2021

Related U.S. Application Data

(63) Continuation of application No. 15/286,161, filed on Oct. 5, 2016, now abandoned, which is a continuation
(Continued)

(51) Int. Cl.
| | |
|---|---|
| *G06T 11/00* | (2006.01) |
| *G06T 11/60* | (2006.01) |
| *G06T 19/00* | (2011.01) |
| *G06T 7/246* | (2017.01) |
| *G06V 10/22* | (2022.01) |
| *G06V 10/147* | (2022.01) |

(Continued)

(52) U.S. Cl.
CPC ............. *G06T 11/00* (2013.01); *G06T 7/246* (2017.01); *G06T 11/60* (2013.01); *G06T 19/006* (2013.01); *G06V 10/147* (2022.01); *G06V 10/22* (2022.01); *G06V 20/20* (2022.01); *H04N 5/2258* (2013.01); *G06T 2207/10021* (2013.01); *G06T 2207/20081* (2013.01); *G06T 2207/30184* (2013.01)

(58) Field of Classification Search
CPC ...... G06V 10/20; G06V 10/22; H04N 5/2258; G06T 11/00; G06T 7/246; G06T 11/60; G06T 19/006; G06T 2207/10021; G06T 2207/20081; G06T 2207/30184
See application file for complete search history.

(56) References Cited

U.S. PATENT DOCUMENTS

| | | | | |
|---|---|---|---|---|
| 2008/0167814 A1* | 7/2008 | Samarasekera | ...... | H04N 13/239 |
| | | | | 701/469 |
| 2009/0097710 A1* | 4/2009 | Sroka | ......................... | G06T 7/74 |
| | | | | 382/103 |
| 2011/0244919 A1* | 10/2011 | Aller | .................. | G06Q 30/0281 |
| | | | | 455/556.1 |

* cited by examiner

*Primary Examiner* — Diane M Wills
(74) *Attorney, Agent, or Firm* — Moser Taboada (57) ABSTRACT

Methods and apparatuses for tracking objects comprise one or more optical sensors for capturing one or more images of a scene, wherein the one or more optical sensors capture a wide field of view and corresponding narrow field of view for the one or more images of a scene, a localization module, coupled to the one or more optical sensors for determining the location of the apparatus, and determining the location of one more objects in the one or more images based on the location of the apparatus and an augmented reality module, coupled to the localization module, for enhancing a view of the scene on a display based on the determined location of the one or more objects.

18 Claims, 9 Drawing Sheets

Related U.S. Application Data of application No. 13/916,702, filed on Jun. 13, 2013, now Pat. No. 9,495,783.

(60) Provisional application No. 61/790,715, filed on Mar. 15, 2013, provisional application No. 61/675,734, filed on Jul. 25, 2012.

(51) Int. Cl.
*G06V 20/20* (2022.01)
*H04N 5/225* (2006.01)

FIG. 8

AUGMENTED REALITY VISION SYSTEM FOR TRACKING AND GEOLOCATING OBJECTS OF INTEREST

CROSS-REFERENCE TO RELATED APPLICATIONS

This application is a continuation of co-pending U.S. patent application Ser. No. 15/286,161 filed Oct. 5, 2016, which is a continuation of U.S. patent application Ser. No. 13/916,702 filed Nov. 15, 2016, which claims benefit of U.S. Provisional Patent Application Ser. No. 61/790,715 filed Mar. 15, 2013, which claims benefit of U.S. Patent Application Ser. No. 61/675,734 filed Jul. 25, 2012, all of which are herein incorporated by reference in their entireties.

GOVERNMENT RIGHTS IN THIS INVENTION

This invention was made with U.S. government support under contract number N00014-11-C-0433. The U.S. government has certain rights in this invention.

BACKGROUND OF THE INVENTION

Field of the Invention

Embodiments of the present invention generally relate to augmented reality and, more particularly, to a method and apparatus for tracking and geolocating objects of interest.

Description of the Related Art

Currently, binoculars are entirely optical devices allowing users to zoom in on a particular real world area from a long distance. If a user is attempting to view precise movements of an object at a distance, such as a car, truck or person, the user is able to use a binocular lens switching mechanism to change to a different magnification. In other binoculars, a "zooming" function is provided which can vary magnification ranges using a switch or lever. However, once the user increases magnification level, the user may experience difficulty in finding the object of interest within the "zoomed" scene.

Further, in conventional binocular system, if there are several binocular users in communication and one user has identified one or more objects of interest such as interesting wildlife, people, or the like, difficulty arises in signaling the location of the object of interest to other binocular users. The user who sighted the object of interest may use landmarks, but this method is imprecise and landmarks may not be in view of other user's binocular systems. In addition there may be several similar landmarks, making it more difficult to identify the precise location of objects of interest.

Therefore, there is a need in the art for a method and apparatus for precisely determining the geolocation of distant objects, in addition to tracking and sharing of the location for those objects.

SUMMARY OF THE INVENTION

An apparatus and/or method for tracking and geolocating objects of interest comprising one or more optical sensors for capturing one or more images of a scene, wherein the one or more optical sensors capture a wide field of view and corresponding narrow field of view for the one or more images of a scene, a localization module, coupled to the one or more optical sensors for determining the location of the apparatus, and determining the location of one more objects in the one or more images based on the location of the apparatus, and an augmented reality module, coupled to the localization module, for enhancing a view of the scene on a display based on the determined location of the one or more objects.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for tracking and geolocating objects of interest. According to one embodiment, an apparatus for tracking objects of interest comprises an optical sensor used in conjunction with positional sensors such as inertial measurement units (IMU) and global navigation satellite systems (such as geographical positioning satellite (GPS) systems, Glonass and Galileo) to locate the apparatus and a laser rangefinder, to geographically localize objects in reference to the location of the optical sensor. Objects of interest are tracked as a user zooms the optical sensors, or the user switches from a wide field of view to a narrow field of view. Embodiments of the present invention preserve a location of an object of interest within the user's view throughout a change in zoom or field of view. Additionally, if the object of interest escapes the user's view during a zooming function, an augmented reality system may provide the user with indicia of the location of the object within the user's view, as well as other pertinent information. An observed scene is augmented with information, labels of real world objects and guidance information on moving a camera unit or binocular unit to view objects of interest in a user's field of view. The augmentation appears stable with respect to the observed scene.

Figure 1:
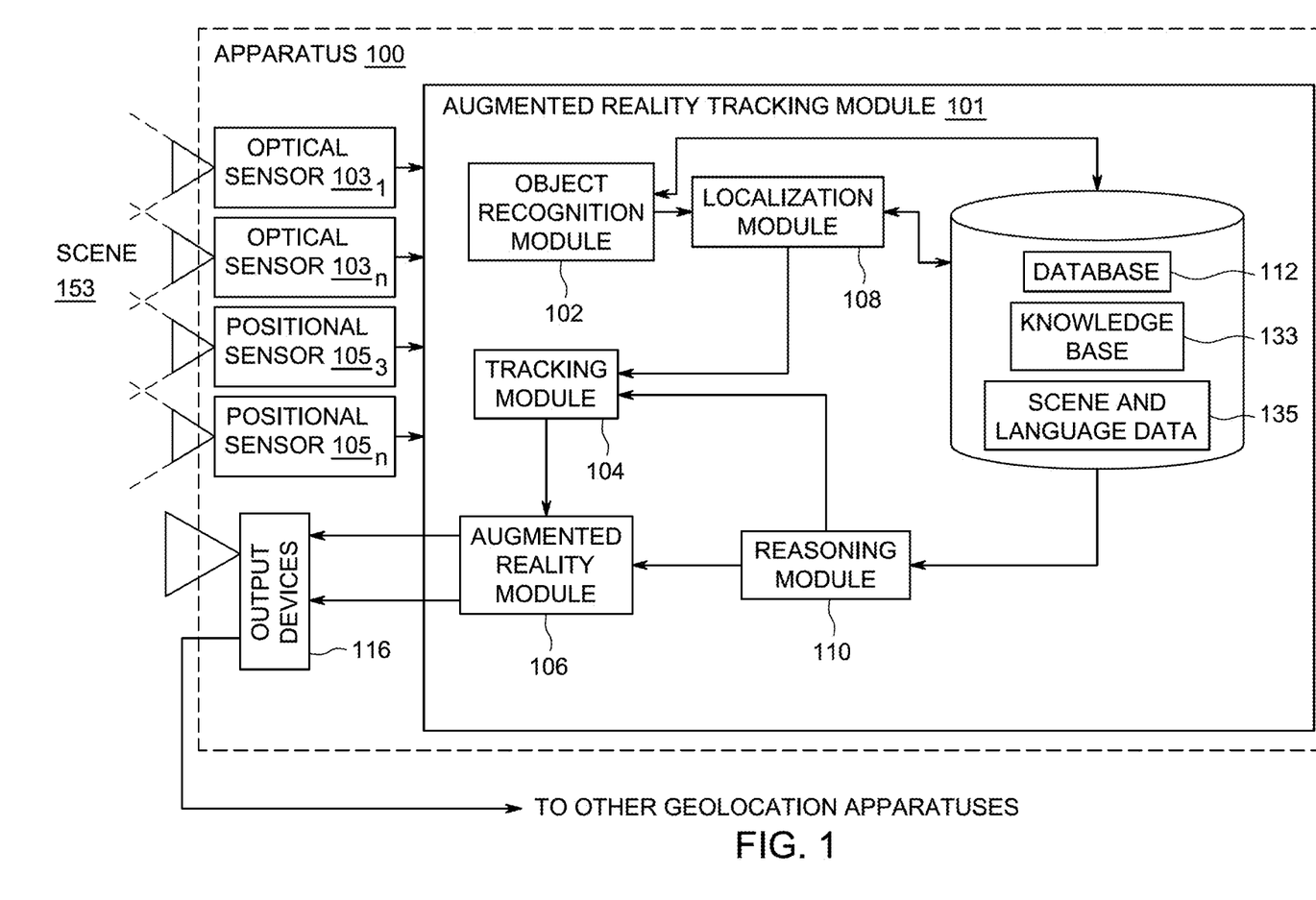
FIG. 1 depicts an apparatus for tracking objects in accordance with exemplary embodiments of the present invention.

FIG. 1 depicts an apparatus for tracking objects 100 in accordance with exemplary embodiments of the present invention. The apparatus 100 comprises an object recognition module 102, sensors $103_1$ to $103_n$ and $105_1$ to $105_n$, a tracking module 104, an augmented reality module 106, a localization module 108, a reasoning module 110, a database 112, and output devices 116. According to exemplary embodiments, the database 112 further comprises a knowledge base 133 and scene and language data 135.

According to one embodiment, the sensors $103_1$ to $103_n$ are optical sensors and the sensors $105_1$ to $105_n$ are positional sensors. In some embodiments, sensors $103_1$ to $103_n$ may comprise infrared (IR) sensors, visible sensors, night-vision sensors, radiation signature sensors, radio-wave sensors or other types of optical sensors. Sensors $103_1$ to $103_n$ simultaneously capture one or more images of a scene 153, while the sensors $105_1$ to $105_n$ capture data about the geographic location and orientation of the apparatus 100. According to an exemplary embodiment, all of the sensors are physically coupled to the apparatus 100. In some embodiments, the one or more sensors $103_1$ to $103_n$ may be housed in a telescope, a binocular unit, a headset, bifocals, or the like. In some instances, the sensors may be remotely located from the apparatus.

One or more of the sensors $103_1$ to $103_n$ comprise a sensor for capturing wide field of view images, e.g. 50 degrees to 80 degrees horizontal field of view, and one or more of the sensors $103_1$ to $103_n$ comprise a sensor for capturing a narrow field of view images, e.g. 1 degree to 10 degrees. A wide angle image of the scene 153 provides context for narrower field of view images. The images captured by sensors $103_1$ to $103_n$ are coupled to the object recognition module 102. The object recognition module 102 performs object recognition on the wide field of view images and the narrow field of view images to recognize objects in all of the images. According to exemplary embodiments, invariant image features are used to recognize objects in the images as described in commonly assigned and issued U.S. Pat. No. 8,330,819 filed on Apr. 12, 2012, commonly assigned U.S. Pat. No. 8,345,988 B2 filed on Jun. 22, 2005 and U.S. Pat. No. 8,243,991 B2, filed on Aug. 14, 2012, herein incorporated by reference in their entirety.

Simultaneously capturing narrow field of view images with wide field of view images of the scene 153 allow the vision algorithms to have additional context in recognizing objects of interest in a scene. The narrow and wide FOV images in conjunction with various positional sensors aid in high-fidelity localization, i.e., highly accurate geolocalization of objects of interest can be achieved. Further, the object recognition module 102 is coupled to database 112 to receive invariant feature records and the like to assist in object recognition. The object recognition module 102 may also receive scene and language data 135 from the database 112 to localize wide angle images, as described in commonly assigned, co-pending U.S. patent application Ser. No. 13/493,654 filed Jun. 11, 2012, herein incorporated by reference in its entirety.

For example, a GNSS received provides an initial bearing of apparatus 100 and an IMU can provide relative movements of the apparatus 100 such as rotation and acceleration. Together, six degrees of freedom (6DOF) can be obtained using the various sensors. In some instances, a GPS signal may only be sporadically available. According to some embodiment, the apparatus 100 can still provide tracking of objects of interest during periods of sporadic GNSS reception. The signals previously received from the GNSS may be stored in a memory of the apparatus 100. The localization module 108 calculates a projected geographical location of the apparatus 100 based on the previously stored GNSS location and trajectory of the apparatus 100 in conjunction with the trajectory of the objects of interest.

The localization module 108 couples the localized object and apparatus information to the tracking module 104. The tracking module 104 correlates the objects in the wide field of view images and the narrow field of view images. For example, in wide field of view images, a dog and cat are recognized at a distance. In narrow field of view images, the dog and cat are recognized and correlated with the dog and cat in the wide field of view images because the location of the dog and cat are known from the localization module 108. The tracking module 104 tracks the location of the dog and cat when a user switches from viewing a wide field of view of the scene to a narrow field of view of the scene 153. This process is referred to as visual odometry, as described in commonly assigned, co-pending U.S. patent application Ser. No. 13/217,014 filed on Aug. 24, 2011, herein incorporated by reference in its entirety. Accordingly, the visual odometry is performed on both the wide field of view and the narrow field of view simultaneously or in parallel. The wide field of view provides robustness, while the narrow field of view provides accuracy. Users may be provided with preset field of view angles; for example, a lens with ten steps of fields of view may be provided to the user. According to some embodiments, to support multiple fields of view, prior geometric calibration may be performed between images taken with different fields of view.

According to other embodiments, a high resolution camera, e.g., a camera that can capture greater than 50 Mega-Pixels (MP) may be used instead of two views of a scene with differing field of view. According to this embodiment, the camera enables a user to capture the wide field of view with a very high resolution, for example, 50 MP or more, and as the user zooms into a particular area of the wide field of view of the scene, there is enough pixel data to represent the narrow field of view of the scene also. The object recognition module 102 uses the wide field of view image to detect objects of interest, and the localization module 108 may use a laser rangefinder to calculate precise geographic coordinates of the objects of interest. The tracking module 104 enables a user of the apparatus 100 to track the objects of interest as the zoom on the camera is changed.

According to exemplary embodiments, the sensors $105_1$ to $105_n$ may comprise navigation sensors such as a GNSS receiver, an IMU unit, a magnetometer, pressure sensors, a laser range-finder and the like. The localization module 108 localizes the apparatus 100 using the sensors $105_1$ to $105_n$ and the narrow/wide field of view images captured by sensors $103_1$ to $103_n$. A three-dimensional location and orientation is established for the apparatus 100 with more accuracy than with the positional sensors $105_1$ to $105_n$ alone. Refer to commonly assigned, co-pending U.S. patent application Ser. No. 13/217,014 filed on Aug. 24, 2011, and commonly assigned U.S. Pat. No. 8,174,568 filed on Dec. 3, 2007, herein incorporated by reference in their entireties, for more detail regarding calculating 3D coordinates based on an image and navigational sensors.

Once the location of the apparatus 100 is calculated, the object recognition module 102 may recognize objects within the wide field of view and narrow field of view of the scene 153. A user of the apparatus 100 may select objects of interest by manually inputting selections in the field of view using a laser rangefinder or the like. In other instances, the object recognition module 102 scans both fields of views and detects objects automatically, based on training data stored in database 112. While a user pans the optical sensors $103_1 \ldots n$ the object recognition module 102 detects objects of interest, for example, facial recognition, movement recognition, bird recognition, or the like. According to exemplary embodiments, the localization module 108 further receives object recognition information from the object recognition module 102 to aid in localization. For example, if the object recognition module 102 recognizes an oak tree at a distance d1 from a park bench at a known location in scene 153 in a wide angle image, and a distance d2 from the apparatus 100, the localization module 108 uses the location of the park bench to determine the accuracy of the estimated distance d1 of the oak tree from the apparatus 100.

The localization module 108 also locates objects of interest in the user's fields of view and generates guides to locate objects of interest. For example, the apparatus 100 may automatically detect different types of birds in a scene 153 and automatically guide a user towards the birds, as well as augmented a user display with information regarding the birds. The user may mark a target bird, stationary or moving, while in a "zoomed out" field of view, and be guided by the registration of images on how to move the camera while zooming in without losing the target object, ensuring the target is still in view.

The reasoning module 110 uses the localization knowledge and the object recognition knowledge from the database 112 to generate relevant content to be presented to the user. A word model consisting of geo-spatial information such as digital terrain, geographical tags and 3D models can be used in the reasoning module 110. Similarly dynamic geographic data can be transmitted to the reasoning module 110 from an external source to augment the reasoning generated by the reasoning module 110. Based on geo-location and context, overlay content can be customized in the reasoning module 110. The overlay is also used in aiding in navigation of a user of the apparatus 100.

The overlay content is then projected using the augmented reality module 106 in the accurate coordinate system of the narrow field of view optical sensors as derived by the localization module 108. Additionally the world model may be used by the reasoning module 110 to determine occlusion information during the rendering process. According to one embodiment, the apparatus 100 is a video see-through system, i.e., a system with an optical sensor as well as an optical viewfinder where content is rendered on the optical viewfinder as the user of apparatus 100 views a scene through the optical viewfinder. In this embodiment, the content is fused with the captured images from the sensor $103_1$ to $103_n$ for display on the viewfinder, allowing the user to view the augmented content overlaid on the scene 153.

Overlaid content may include dynamic information such as weather information, social networking information, flight information, traffic information, star-map information, and other external geographically located information fed into the system. Another example of geographically located information may include overlaying real-estate house and commercial sales information, tourist attractions, and the like on a view of the apparatus 100.

According to one embodiment, a visually impaired person wearing a single head or body mounted camera may be aided using the apparatus 100. As a visually impaired individual pans his or her head, an implicit image mosaic or landmark images are generated by the AR tracking module 101 and stored in database 112. An object of interest can be designated in a certain view by image processing by the object recognition module 102 or manually by the user. The visually impaired user is then able to move around, but be guided back to the designated view-point or location based on the geolocated apparatus 100 as well as through alignment of images from the camera with landmark and mosaic images stored in the database 112.

According to other embodiments, the database 112 may store images or videos of people of interest, such as celebrities, athletes, news-worthy figures, or the like. The object recognition module 102 may then perform object recognition while a user is scanning a scene and match against the people of interest stored in database 112 to identify people of interest in the scene.

Figure 2:
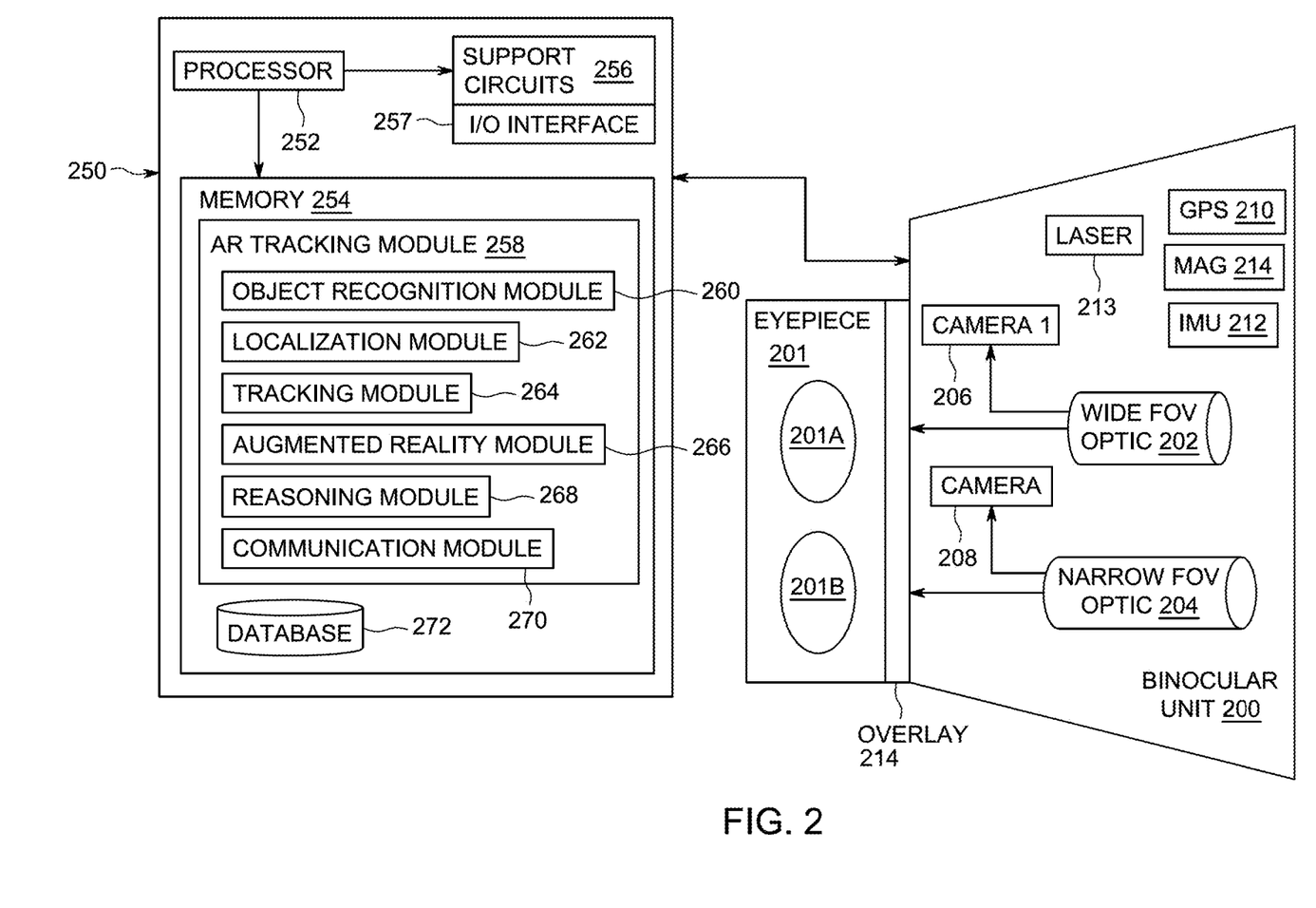
FIG. 2 depicts an embodiment of the apparatus as a binocular unit in accordance with exemplary embodiments of the present invention.

FIG. 2 depicts an embodiment of the apparatus 100 as a binocular unit 200 in accordance with exemplary embodiments of the present invention. The binocular unit 200 comprises a wide field of view optic 202 and a narrow field of view optic 204, i.e., a wide field of view lens and a narrow field of view lens, an eyepiece 201, a GNSS 210, a magnetometer 214, an IMU 212 and a laser rangefinder 213. According to some embodiments, the laser rangefinder 213 may be replaced with an ultrasonic rangefinder or by estimating range from ray tracing to a 3D model of the scene given the user's location and view-point.

According to some embodiments, the computer system 250 may be housed internally in the binocular unit 200. In other embodiments, the computer system 250 is remote from the binocular unit 200 and the binocular unit 200 transmits and receives data from the computer system 250 through wired transmission lines, or wirelessly.

The wide FOV optic 202 is coupled to the camera 206. The narrow FOV optic is coupled to the camera 208. The camera 206 and camera 208 are coupled to a computer system 250. The wide FOV optic 202 and the narrow FOV optic 204 are both coupled to the eyepiece 201. The eyepiece 201 comprises, according to one embodiment, a first lens 201A and a second lens 201B. In other embodiments, the eyepiece 201 may comprise only a single viewing lens, or more than two viewing lenses.

In some embodiments, a user of the binocular unit 200 is able to switch between viewing the wide FOV optic view and he narrow FOV optic view in the eyepiece 201. The laser rangefinder 213 outputs a laser towards a direction aligned with the orientation of the binocular unit 200. The laser rangefinder 213 establishes distances to objects within the field of view of the binocular unit 200. In addition, the laser rangefinder may be used to map the terrain into three-dimensional space, and store the 3D terrain map in the database 272.

The computer system 250 includes a processor 252, various support circuits 256, and memory 254. The processor 252 may include one or more microprocessors known in the art. The support circuits 256 for the processor 252 include conventional cache, power supplies, clock circuits, data registers, I/O interface 257, and the like. The I/O interface 257 may be directly coupled to the memory 254 or coupled through the supporting circuits 256. The I/O interface 257 may also be configured for communication with input devices and/or output devices such as network devices, various storage devices, mouse, keyboard, display, video and audio sensors and the like.

The memory 254, or computer readable medium, stores non-transient processor-executable instructions and/or data that may be executed by and/or used by the processor 252. These processor-executable instructions may comprise firmware, software, and the like, or some combination thereof. Modules having processor-executable instructions that are stored in the memory 254 comprise an augmented reality (AR) tracking module 258. The AR tracking module 258 further comprises an object recognition module 260, a localization module 262, a tracking module 264, an augmented reality module 266, a reasoning module 268 and a communication module 270.

The computer 250 may be programmed with one or more operating systems (generally referred to as operating system (OS)), which may include OS/2, Java Virtual Machine, Linux, SOLARIS, UNIX, HPUX, AIX, WINDOWS, WINDOWS95, WINDOWS98, WINDOWS NT, AND WINDOWS2000, WINDOWS ME, WINDOWS XP, WINDOWS SERVER, WINDOWS 8, Mac OS X, IOS, ANDROID among other known platforms. At least a portion of the operating system may be disposed in the memory 404.

The memory 254 may include one or more of the following random access memory, read only memory, magneto-resistive read/write memory, optical read/write memory, cache memory, magnetic read/write memory, and the like, as well as signal-bearing media as described below.

The camera 206 and the camera 208 are coupled to the support circuits 256 and the I/O interface 257 of the computer system 250. The I/O interface 257 is further coupled to an overlay 214 of the eyepiece 201. The object recognition module 260 recognizes objects within the wide FOV optic 202 and the narrow FOV optic 204 as the images are received by the cameras 206 and 208, i.e., in real-time as the user of the binocular unit 200 scans a viewing area. According to one embodiment, the user can scan a larger area than that visible in the wide FOV optic 202 and have the object recognition module 260 scan for objects in the larger area. Additionally, the user can identify, using the laser rangefinder 213, or other visual means, an object of interest to track or recognize, and the object recognition module 260 will perform object recognition on that particular object, or the user designated area.

The objects recognized by the object recognition module 260 are localized using the localization module 262 and tracked by the tracking module 264. The tracking module 264 may also notify the augmented reality module 266 that a visual indication should be rendered to indicate the location of a particular recognized object, even if the object moves out of view of the binocular unit 200. The augmented reality module 266 then creates an overlay for the narrow field of view based on the recognized object, requested content by the user, markers indicating the location of recognized objects, amongst additional augmented reality content known to those of ordinary skill in the art. The content is then coupled from the augmented reality module 266 to the binocular unit 200 and, in particular, to the eyepiece 201 as overlay 214. According to this embodiment, the overlay 214 overlays the real-time view through the lenses 201A and 201B, i.e., as the user surveys a scene through the lenses 201A and 201B, the overlay 214 is also visible through the lenses 201A and 201B. The augmented reality module 266 generates the overlay 214 in geometrical and geographical correspondence with the terrain visible to the user through the binocular unit 200.

Figure 3:
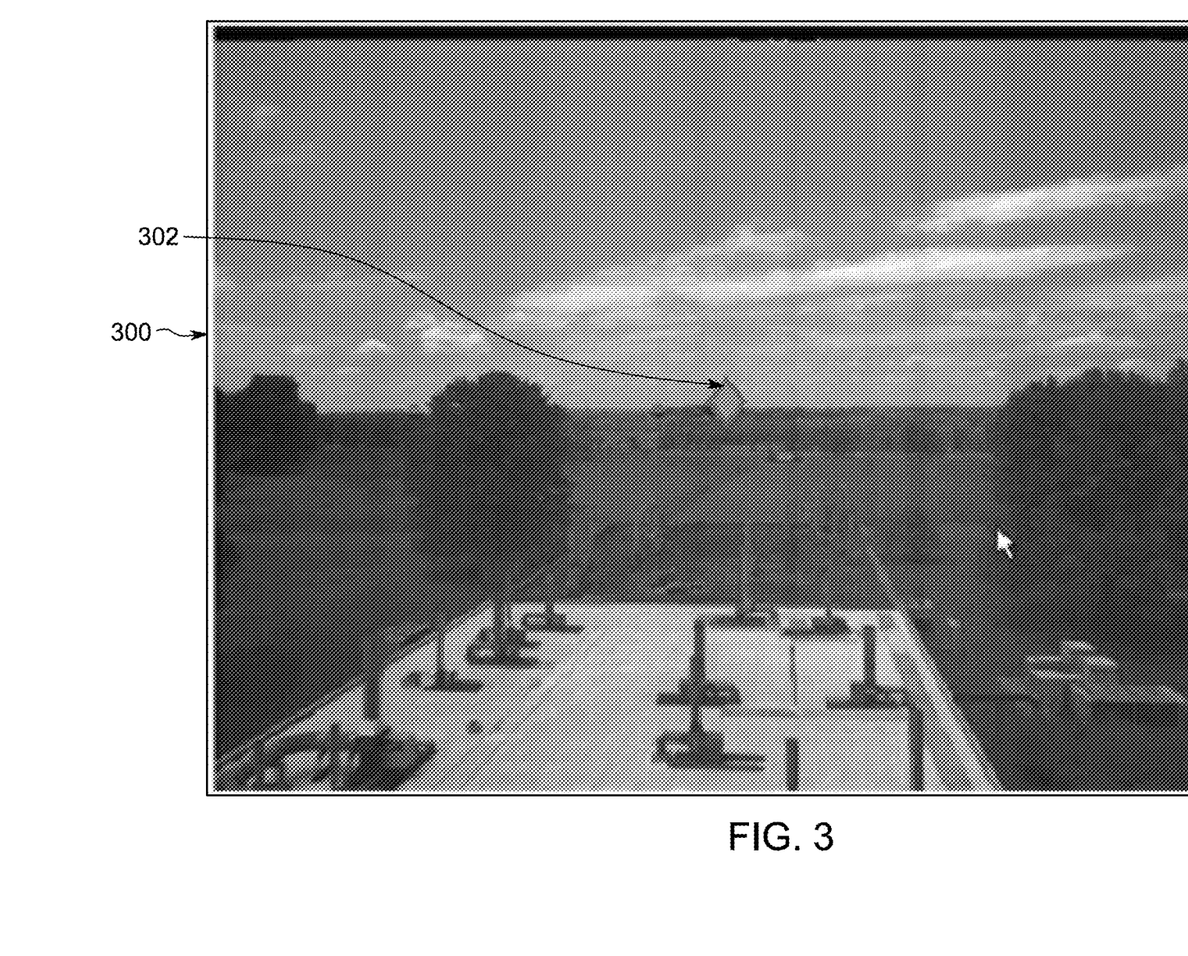
FIG. 3 depicts an image captured by narrow field of view optics in accordance with exemplary embodiments of the present invention.
Figure 4:
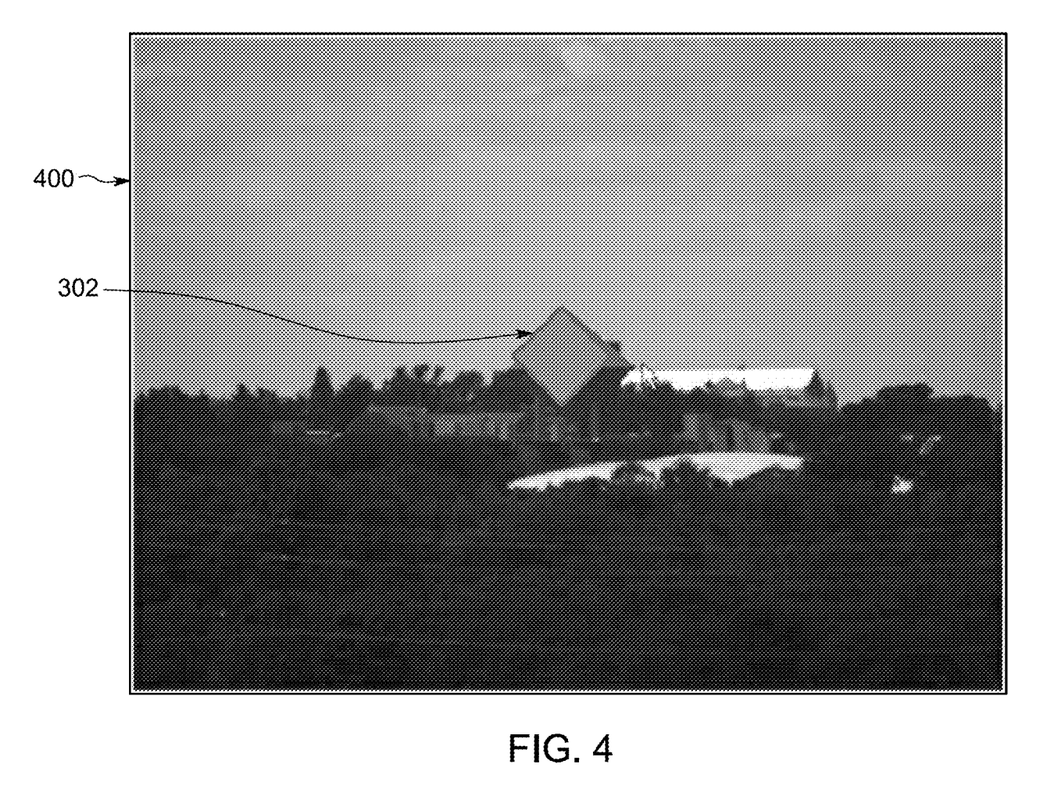
FIG. 4 depicts an image captured by wide field of view optics in accordance with exemplary embodiments of the present invention.

For example, a binocular unit 200 may observe, with the wide FOV optic 202, a scene depicted by the image 300 shown in FIG. 3 and with the narrow FOV optic 204 observe a scene depicted by the image 400 shown in FIG. 4. In image 300, a user has marked a landmark as a landmark of interest after the object recognition module 260 has recognized the objects in the image 300 and the localization module 262 localized the landmark of interest. When the user zooms or alternates views to the narrow field of view from the eyepiece 201, the augmented reality module 266 places the marker 302 appropriately to indicate the landmark of interest according to the modified view, because the localization module 262 has precisely located the landmark in geographic space. According to other embodiments, the object may be tracked so that when a user of the unit 200 moves, the tracked objects of interest remain centered in the near field of view.

Figure 5:
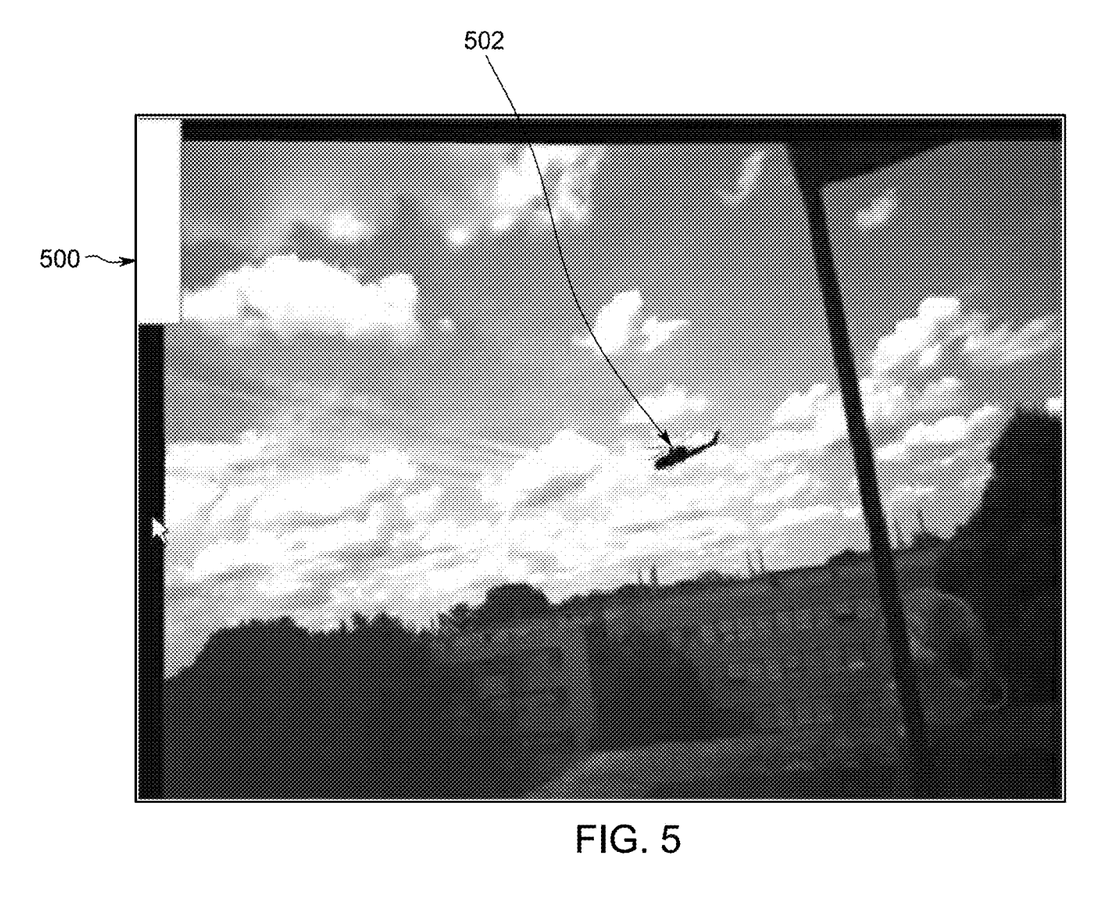
FIG. 5 depicts a wide field of view image, where a helicopter is placed at a particular location in accordance with exemplary embodiments of the present invention.
Figure 6:
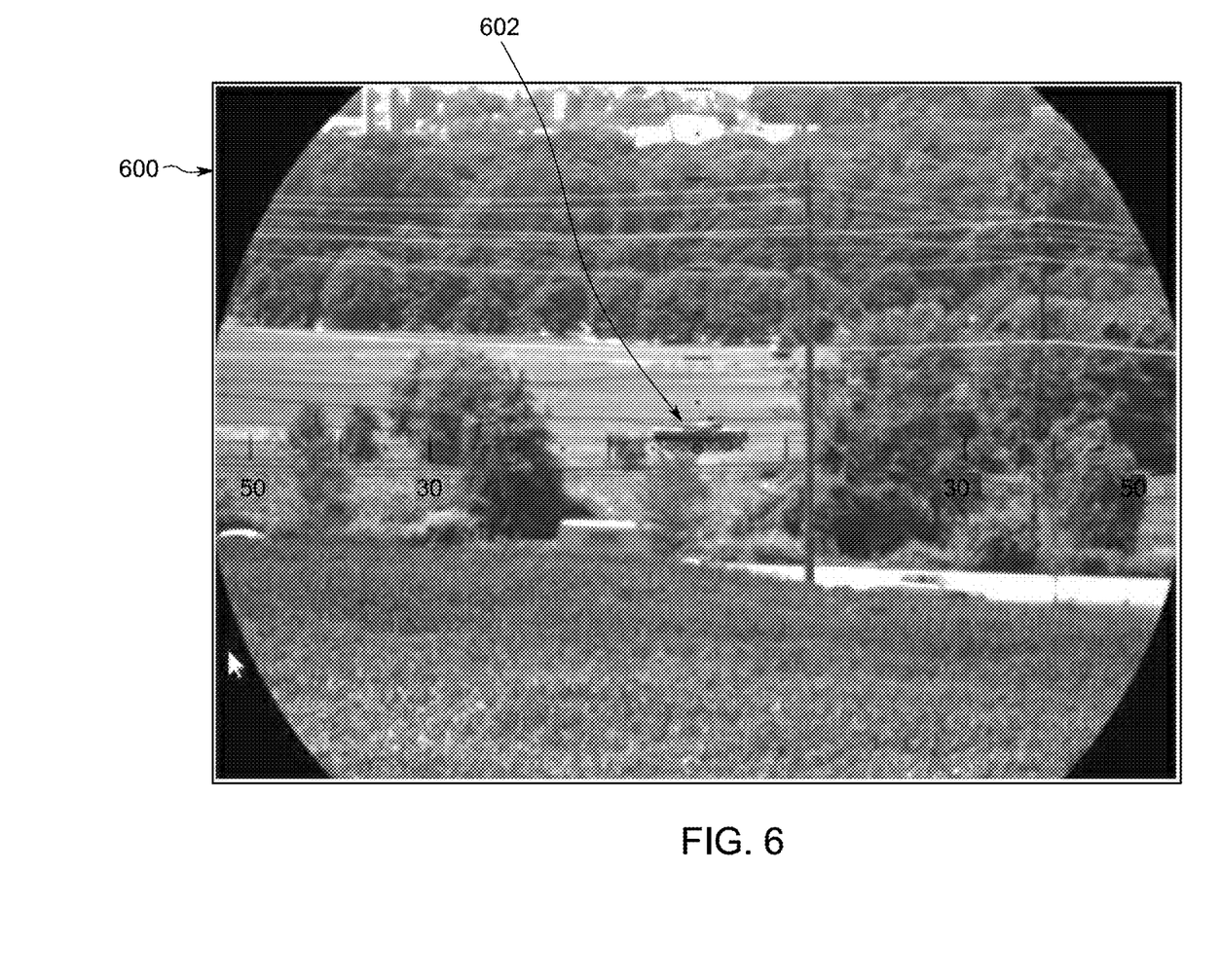
FIG. 6 depicts a wide field of view image, where a tank is placed at a particular location in accordance with exemplary embodiments of the present invention.

According to another embodiment, the augmented reality module 266 can overlay the view from a binocular unit 200 to create a simulation. For example, FIG. 5 depicts a wide FOV image 500, where a user of a binocular unit 200 indicates that a helicopter 502 should be placed at a particular location. The augmented reality module 266 places the helicopter in the preferred location, and overlay the helicopter in real time on overlay 214, where the position of the helicopter in the user's view changes as the user adjusts the binocular unit 200. The AR module 266 scales, rotates and translates the helicopter simulation based on the geographic localization data of the binocular unit 200 and the rotational movement of the IMU 212. FIG. 6 depicts another example of inserting simulated objects into a scene for aiding in simulated operations. Image 600 depicts a narrow field of view scene with a tank object 602 inserted into the scene. According to exemplary embodiments, the tank 602 may be animated by the augmented reality module 266, with a size, location and orientation corresponding to the other objects recognized by the object recognition module 260 and the orientation of the device according to the localization module 262 to create a mixed reality and simulated environment to aid in user training, such as procedural training, strategic training or the like.

Additionally, the reasoning module 268 may occlude the tank as it is animated to conform to the terrain depicted in image 600. According to another embodiment, a user of the binocular unit 200 may scan a scene by spatially moving the binocular unit 200 to geographically locate the entire scanned contents of the scene. The reasoning module 268 can then generate a three-dimensional terrain based on the geographically located objects, terrain, and the like. The wide field of view and narrow field of view images can be used to construct a 3D map of an observed area by imaging the area based on multiple images, and then estimating the 3D by a motion stereo process accurately using the geographic location provided by the various sensors 210-214, as described in U.S. patent application Ser. No. 13/493,654 filed on Jun. 11, 2012, herein incorporated by reference in its entirety.

Figure 7A:
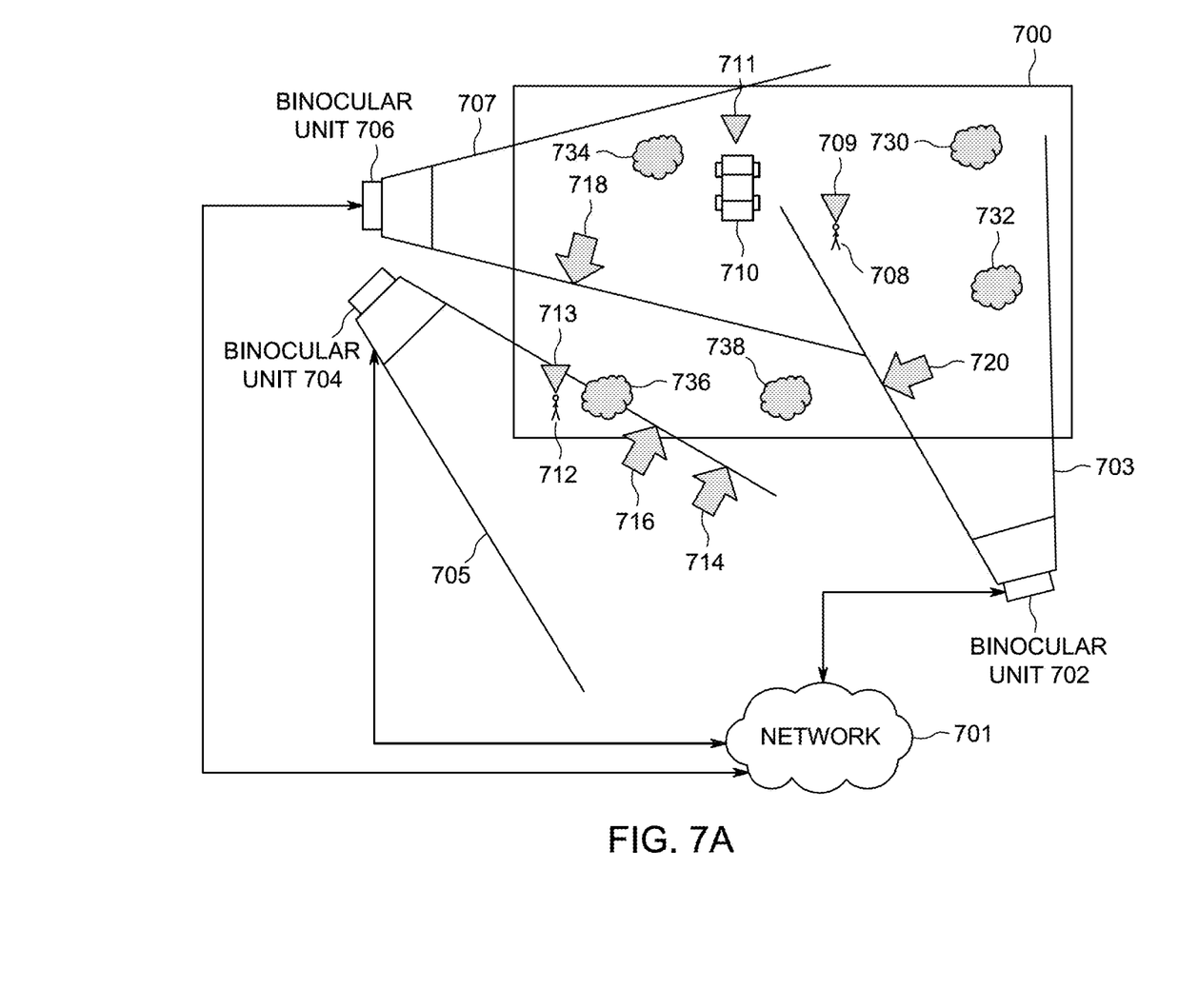
FIG. 7A depicts a plurality of binocular units viewing portions of a scene in accordance with exemplary embodiments of the present invention.

FIG. 7A depicts a plurality of binocular units viewing portions of a scene 700 in accordance with exemplary embodiments of the present invention. In accordance with exemplary embodiments, FIG. 7 depicts a guidance system based on image processing and alignment of wide and narrow imagery. In this embodiment, the binocular unit (BU) 702, BU 704 and BU 706 comprises an augmented tracking module as depicted in FIG. 2, communicating wired or wirelessly, between each other through the network 701. In other embodiments, each binocular unit is coupled, wired or wirelessly, to a remote computer system such as computer system 250 through the network 701.

The scene 700 comprises one or more objects, the one or more objects comprising a first person 708, a vehicle 710 and a second person 712. The scene 700 is being observed by three users: a first user operating BU 702, a second user operating BU 704 and a third user operating BU 706, each oriented in a different direction. Though not shown in FIG. 7, each of the BU 702, 704 and 706 may be oriented in three-dimensional space, as opposed to the 2D plane depicted. For example, BU 704 may be positioned at a height above BU 706, and BU 704 may be looking at an area in scene 700 lower in height than the area in scene 700 being viewed by BU 706.

The BU 706 has person 708 and vehicle 710 in view. The operator of BU 706 identifies person 708 and vehicle 710 as objects of interest using a laser rangefinder, or in some other manner well known in the art such as delimiting a particular area wherein the person 708 and the vehicle 710 are located and directing the unit 706 to perform object recognition.

The BUs is all coupled to the network 701. According to some embodiments, the BUs 702, 704 and 706 create an ad-hoc network and communicate directly with each other.

The scene 700 is an example view of a field containing several objects: a person 708, a vehicle 710, a second person 712 and several trees and bushes 732-736. According to one embodiment of the present invention, the user of binocular unit 706 may mark the location using a laser rangefinder, or other means, of the person 708 and the vehicle 710. A marker 709 identifies the location of the first person 708 and the marker 711 identifies the location of the vehicle 711. The marker and location are shared across the network 701 with the other BUs 702 and 704. Similarly, the BU 705 marks the location of the second person 712 with a marker 713.

The first person 708 and the vehicle 710 are in the view 707 of BU 707; however they are out of the view of BU 704. If the operator of BU 706 directs the attention of the user of the BU 704 towards the vehicle 710 and the first person 708, the user will have indications in their view 705 showing where to turn their BU 704 to view the person 708 and the vehicle 710. For example, indicator 714 is shown as pointing in the direction that the BU unit 704 must turn in order to see person 708. Indicator 716 indicates the direction the BU 704 must turn to view vehicle 710. According to this embodiment, since the localization module of BU unit 706 has localized vehicle 710 and first person 708, the location is available to all units on the network 701. The AR module of each of the BU units generates the indicators 716 and 714.

Similarly, the AR module of the BU unit 706 generates an indicator 718 pointing in the direction of the person 712 and the AR module of the BU unit 702 generates a marker 720 pointing in the direction of the location of person 712.

The BU 702 also has first person 708 in its view 703. The user of BU 702 may also mark the location of first person 708 using the laser rangefinder. Since both BU unit 702 and BU unit 706 have marked the location of person 708, the localization module may localize person 708 more accurately given two perspectives and two distances from the BUs. In addition, when a user of any of the BUs pan their own view, they do not lose sight of the objects in the scene 700 because of the indicators 714, 716, 718 and 720, as well as the markers 709, 711 and 712.

According to other embodiments, the AR modules of each BU may augment the BU view of the scene based on the determined location of the objects with many other types of data such as distance, motion estimation, threat level, or the like. In other instances, facial and object recognition may be applied in an urban setting for recognizing faces and well-known structures to aid in guidance towards a particular landmark. A user of the BU 702, or even a mobile phone with a camera, may designate and identify real world objects in wide and narrow field of views, while panning the phone or keeping the device still. The object is then located according to the discussion above geographically in world space, and in local view. The AR module 106 then provides audio and/or visual guidance to another user on how to move their device to locate the target object. In addition, users performing the object tagging may attach messages to their tagged objects, or other tags such as images, video, audio or the like.

Other users of mobile devices may then have objects of interest highlighted on their displays, or have directions towards the highlighted objects on their displays. In some embodiments, one of the viewers of a scene may be viewing the scene aerially, while other viewers of a scene are on the ground and either party may tag/highlight objects of interest for the users to locate or observe.

Those of ordinary skill in the art would recognize that the Binocular units 702, 704 and 706 may be replaced with, for example, a head-mounted display/vision unit, a mobile camera or the like. A head-mounted display or vision unit may be wearable by a user, who can view the surrounding scene through the visor or glasses in the head-mounted unit, and also view the AR enhancements in the visor or glasses overlaid on top of the user's view of the scene.

For example, several users of head-mounted units 702, 704 and 706 may be engaged in a session of gaming (i.e., playing a video game) where objects are rendered onto each user's field of view with regard to each unit's frame of reference, view and angle. In this embodiment, the scene can become a virtual gaming arena where users can view and use real-world objects with simulated objects to achieve particular goals, such as capturing a flag or scoring a point in a sport. In these embodiments, as well as other embodiments, virtual advertisements may be displayed on each user's view in a geographically sensible position as in-game advertisements.

Figure 7B:
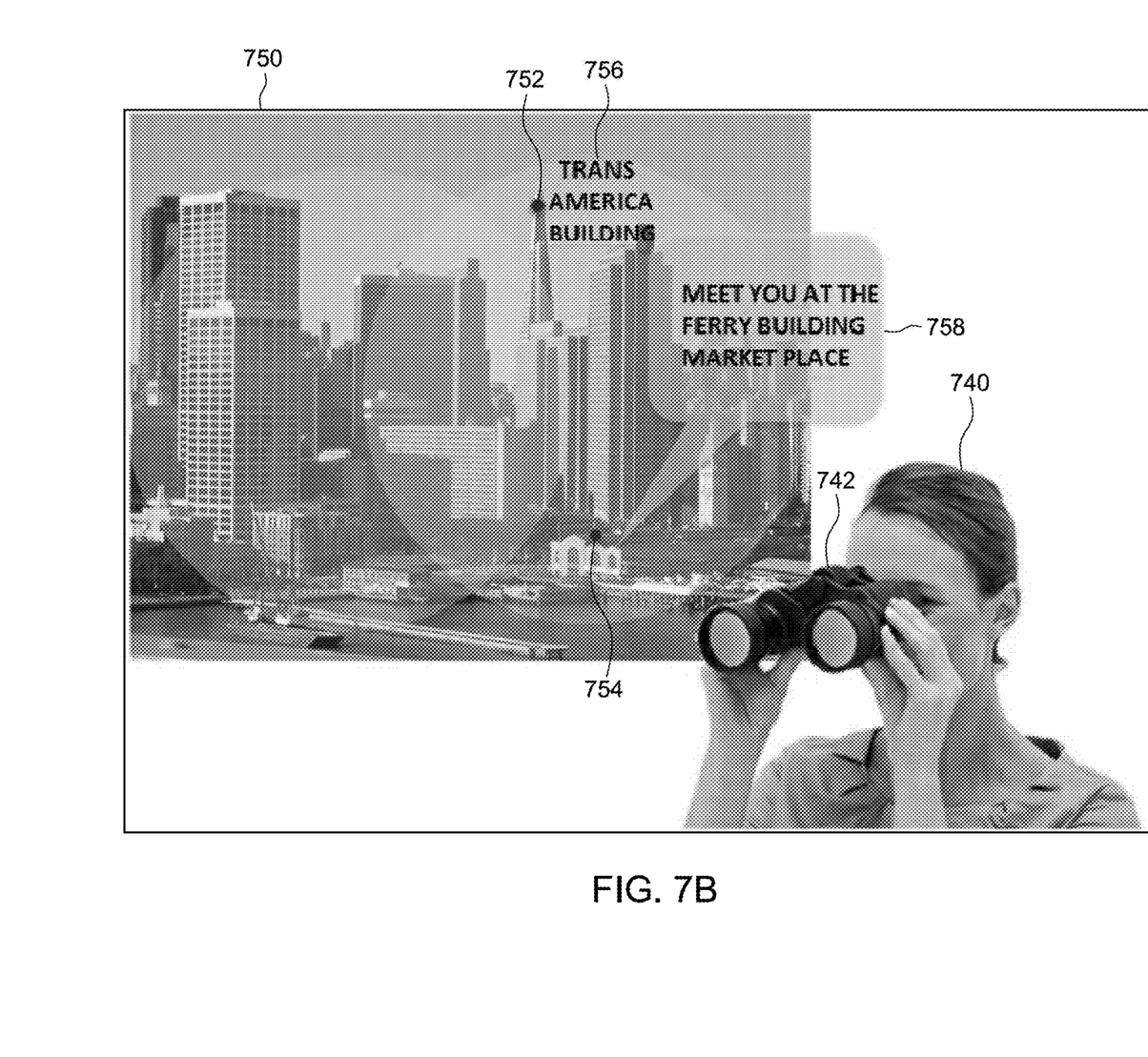
FIG. 7B depicts an exemplary use of the apparatus 100 in accordance with exemplary embodiments of the present invention.

FIG. 7B depicts an exemplary use of the apparatus 100 in accordance with exemplary embodiments of the present invention. A user 740 uses the apparatus 100, here shown as binocular unit 742, to observe a scene 750 of a cityscape containing several landmarks and objects of interest. For example, the view of unit 742 may have an augmented display showing the building 752 tagged with a tag 756 indicating that building 752 is the "Trans America Building". The building 754 may also be tagged as the "Ferry Building Market Place". In addition, the user 740 may attach a geographical tag (geo-tag) to the building 754 stating "Meet you at the Ferry Building Place" for members of their party as a coordination point. Accordingly, embodiments of the present invention may apply to tourism. Users may augment the view from their viewing units with landmarks and points of interest. Geo-tags may be left for friends. In addition, markups can be left on GOOGLE Earth or other mapping services. In exemplary embodiments, different detection algorithms can be plugged in to the object detection of the binocular units, or may be available in the cloud. The images captured by the binocular units may be processed by a local plug-in module or may be sent to a remote cloud for analysis. Alternatively, tracking by another system such as a unmanned aerial vehicle (UAV) may be sent to the binocular units for display. For moving objects, the user 740 may mark a moving object, while a second user using another viewing unit may perform an object detection search to detect the moving object and recognize the moving object.

According to some instances, when users create Geo-tags, they may be stored in a local ad-hoc network created by similar viewing units throughout a particular area, or units manually synced together. Geo-tags and other messages may then be shared directly from one binocular unit another binocular unit. In other embodiments, the geo-tags and other landmark/objects of interest tags and markings are stored on external servers, "cloud servers" for example, and each unit may access the cloud to access geo-tags associated with them (i.e., tags within the user's group), or global geo-tags depending on their preference. In this embodiment, a second user's location is determined to be in the same vicinity as one of the geo-tags and the cloud server transmits the tags within the user's area. Geo-tags, objects of interest and guided directions towards objects of interest may then be downloaded from the external cloud servers and used to overlay an AR display on an AR viewing unit. In other embodiments, users can share geo-tags, objects of interest, landmarks, and the like, with other users by giving an input command, such as a speech command or at the press of a menu item.

According to exemplary embodiments, the apparatus 100 may have a application programming interface (API) which allows developers to plug-in particular applications of object detection such as in recreational sports, bird-watching, tourism, hunting, hiking, law enforcement and the like.

Figure 8:
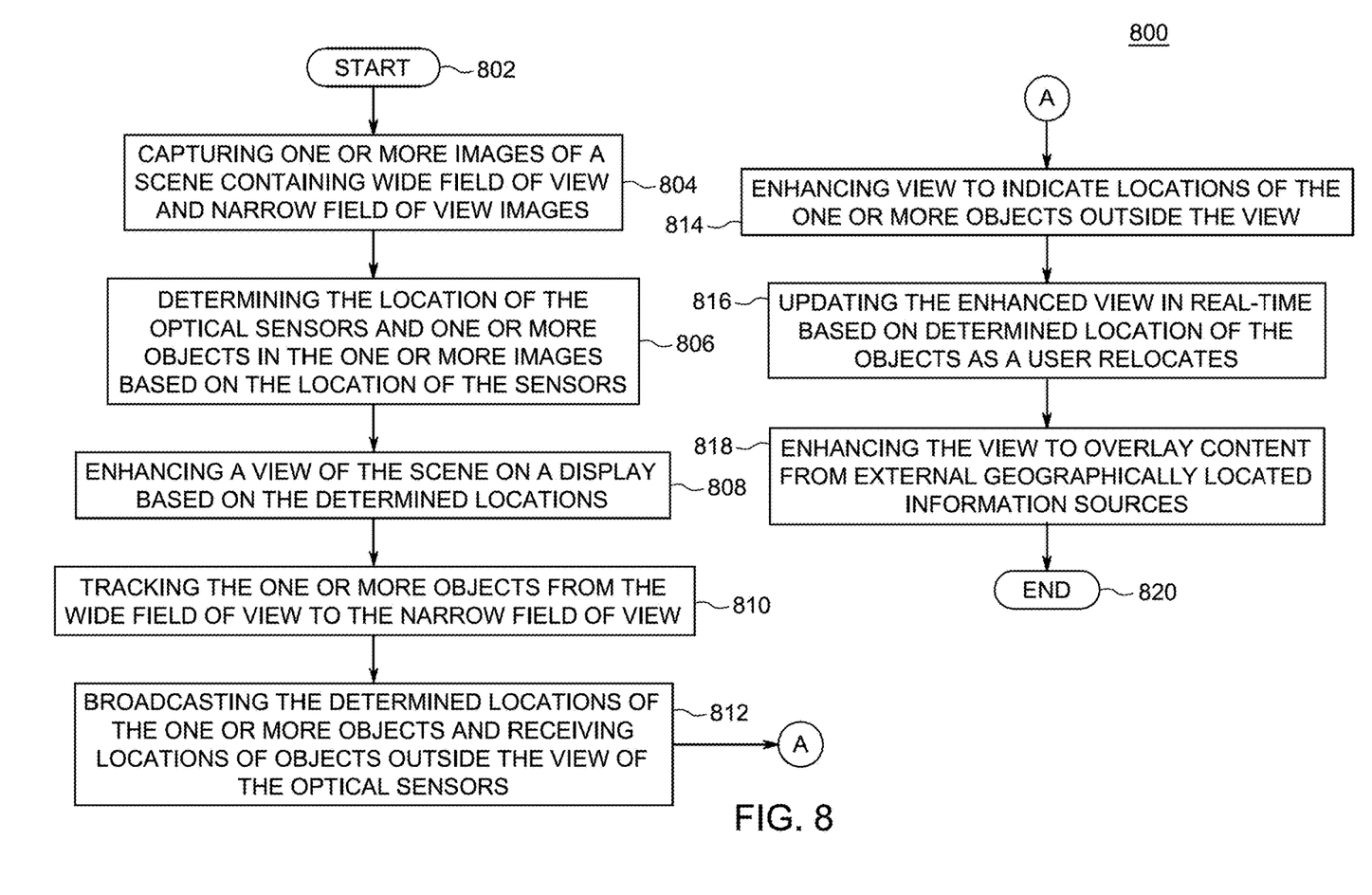
FIG. 8 depicts a method for object detection in accordance with exemplary embodiments of the present invention.

FIG. 8 depicts a method 800 for object detection in accordance with exemplary embodiments of the present invention. The method 800 depicts the functionality of the inferencing module augmented reality tracking module 258 of FIG. 2, as executed by the processor 252. The method begins at step 802 and proceeds to step 804.

At step 804, one or more optical sensors capture one or more images of a scene containing wide field of view and narrow field of view images. In some embodiments, the images are captured and processed in real-time, i.e., as a user views a scene in the narrow field of view, a larger field of view image containing the scene is also being captured by the optical sensors.

At step 806, the localization module 262, determines the location of the optical sensors. In this embodiment, the user is directly holding, or otherwise coupled with, the location of the optical sensors, so that the location of the optical sensors is essentially equivalent to the location of the user of BU 200, for example. The object recognition module recognizes objects in the images and, using the laser rangefinder 213 of the BU 200, the distance between the optical sensor and the objects can be determined. Since the location of the BU 200 has been determined, and the distance to the objects has been determined, the location of the objects can also be accurately determined. In addition, if several binocular units observe the same objects, another degree of accuracy is added to the determined location of the objects.

At step 808, the AR module 266 enhances the view through the BU 200 based upon the determined locations of the objects. As described above, the AR module 266 overlays content on the user's view. The content may include markers of objects of interest, indicators directing the user of BU 200 to objects of interest outside of the current field of view, weather information, flight map information, and other information.

At step 810, the tracking module 264 tracks the one or more objects from the wide field of view to the narrow field of view as a user switches between the two fields of view.

For example, the user of BU 200 may view the wide FOV scene and sight a bird of interest. However, in order to see the bird in more detail, the user of BU 200 switches to a narrow field of view.

Under ordinary circumstances, the user would have difficulty in finding the bird again in the narrow field of view. However, the tracking module 264 tracks the objects from the wide FOV to the narrow FOV, so the user will be presented with a narrow FOV already containing the bird. According to another embodiment, when a user switches from a wide FOV to a narrow FOV, the AR module 266 overlays an indication of the direction in which to rotate the BU 200 to locate the bird of interest.

At step 812, the BU 200 may use the communication module 270 to broadcast the determined locations of the BU 200 in addition to the objects of interest found, to other people in the area with mobile devices, binocular units, mobile computers or the like. In addition, the other people in the area may send the location of objects of interest outside of the user's field of view to the communication module 270. At step 814, accordingly, the AR module 266 updates the overlay on the enhanced view indicating the direction in which to look to find those objects of interest outside the user's field of view.

Subsequently, the method 800 moves to step 816. At step 816, the enhanced view is updated in real-time based on the determined location of the one or more detected objects as the user relocates the BU 200. At step 818, the view is further enhanced to incorporate external sources of geographically located information sources. For example, traffic may be overlaid on the BU 200 view, weather information, social media information, or the like. According to some embodiments, based on the determined location of the BU 200 and selected objects of interest, the AR module 266 may overlay virtual advertisements relevant to the user location. The method terminates at step 820.

Various elements, devices, modules and circuits are described above in association with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A method identifying and sharing virtual objects in three-dimensional (3D) space between a plurality of users with different viewing perspectives comprising:
viewing, by a first user using a first AR binocular unit of a plurality of AR binocular units, portions of a scene, wherein each of the plurality of AR binocular units are associated with different users with different viewing perspectives of the scene and coupled to a common network;
identifying, by the first user using the first AR binocular unit, one or more objects or regions within the scene as an object or region of interest using one or more positional sensors to determine a location of the object or region of interest, wherein identifying objects or regions of interest includes associating a marker with, and storing a location of, the identified objects or regions of interest, wherein identifying one or more objects or regions within the scene as an object or region of interest further includes:

delimiting an area in the scene where the one or more objects or regions of interest are geo-located by ray tracing from the first AR binocular unit to a terrain map;

performing object recognition within the delimited area; and identifying and geo-locating at least one of the objects recognized as an object of interest; and broadcasting, via the common network, the markers and locations of the objects or regions of interest identified using the first AR binocular unit with the plurality of AR binocular units viewing the scene.

2. The method of claim 1, wherein the one or more position sensors is at least one of a laser rangefinder, an ultrasonic rangefinder, a GNSS receiver, an IMU unit, a magnetometer, or pressure sensors.

3. The method of claim 1, further comprising:
receiving, by the first AR binocular unit, one or more markers and locations of objects or regions of interest identified by at least one other user of the plurality of AR binocular units.

4. The method of claim 3, further comprising:
enhancing the scene of the first AR binocular unit to indicate a location of one or more markers.

5. The method of claim 1, further comprising:
generating, within the scene as viewed by the first user of the first AR binocular unit, an indicator for each of the of the markers of the one or more objects or regions of interest identified by other users of the plurality of AR binocular units, wherein each indicator points in a direction within the scene of the marker it is associated with.

6. The method of claim 5, further comprising:
updating the indicators and directions they are pointing to within the scene of the first AR binocular unit as the first user moves within the scene.

7. The method of claim 5, further comprising:
updating the locations of the markers displayed and the indicators and the directions they are pointing to within the first AR binocular unit using location information received from additional AR binocular units used by different users viewing the scene.

8. The method of claim 1, further comprising:
enhancing the scene of the first AR binocular unit by overlaying geographically located information from external sources into the scene from the viewing perspective of the first user.

9. The method of claim 1, further comprising:
attaching at least one of messages, images, video, or audio objects to a marker or identified object of interest.

10. The method of claim 1, wherein the first AR binocular unit is a mobile phone with a camera.

11. A system for identifying and sharing virtual objects in three-dimensional (3D) space between a plurality of users with different viewing perspectives comprising:

a first AR binocular unit of a plurality of AR binocular units configured to view portions of a scene, wherein each of the plurality of AR binocular units are associated with different users with different viewing perspectives of the scene and coupled to a common network;

an augmented reality module configured to identify, by a first user using the first AR binocular unit, one or more objects or regions within the scene as an object or region of interest using one or more positional sensors to determine a location of the object or region of interest, wherein identifying objects or regions of interest includes associating a marker with, and storing a location of, the identified objects or regions of interest, wherein the augmented reality module is further configured to:

delimit an area in the scene where the one or more objects or regions of interest are geo-located by ray tracing from the AR binocular unit to a terrain map;

perform object recognition within the delimited area; and identify and geo-locate at least one of the objects recognized as an object of interest; and a communication module configured to broadcast, via the common network, the markers and locations of the objects or regions of interest identified using the first AR binocular unit with the plurality of AR binocular units viewing the scene.

12. The system of claim 11, further comprising:
a tracking module configured to track objects within the scene.

13. The system of claim 11, wherein the communication module is further configured to receive, by the first AR binocular unit, one or more markers and locations of those markers associated with objects or regions of interest identified by at least one other user of the plurality of AR binocular units.

14. The system of claim 13, wherein the augmented reality module is further configured to enhance the scene of the first AR binocular unit to indicate a location of the received one or more markers.

15. The system of claim 13, wherein the augmented reality module is further configured to generate, within the scene as viewed by the first user of the first AR binocular unit, an indicator for each of the of the received one or more markers of the one or more objects or regions of interest identified by other users of the plurality of AR binocular units, wherein each indicator points in a direction within the scene of the marker it is associated with.

16. The system of claim 15, wherein the augmented reality module is further configured to update the indicators and the directions they are pointing to within the scene of the first AR binocular unit as the first user moves within the scene.

17. The system of claim 15, wherein the augmented reality module is further configured to update the locations of the markers displayed and the indicators and the directions they are pointing to within the first AR binocular unit using location information received from additional AR binocular units used by different users viewing the scene.

18. The system of claim 11, wherein the first AR binocular unit is a mobile phone with a camera.

* * * * *

UNITED STATES PATENT AND TRADEMARK OFFICE
CERTIFICATE OF CORRECTION

PATENT NO. : 11,423,586 B2
APPLICATION NO. : 17/157065
DATED : August 23, 2022
INVENTOR(S) : Samarasekera et al.

It is certified that error appears in the above-identified patent and that said Letters Patent is hereby corrected as shown below:

In the Claims

In Claim 5, Column 13, the phrase "of the of the" should be amended to read "of the"

In Claim 15, Column 15, the phrase "of the of the" should be amended to read "of the"

Signed and Sealed this
Fourth Day of April, 2023

Katherine Kelly Vidal
*Director of the United States Patent and Trademark Office*